(12) United States Patent
Hughes et al.

(10) Patent No.: US 8,738,865 B1
(45) Date of Patent: May 27, 2014

(54) IDENTIFICATION OF DATA STORED IN MEMORY

(75) Inventors: David Anthony Hughes, Los Altos, CA (US); Zhigang Yin, Mountain View, CA (US); John Burns, Los Altos, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 0 days.

(21) Appl. No.: 13/427,422

(22) Filed: Mar. 22, 2012

Related U.S. Application Data

(63) Continuation of application No. 11/825,440, filed on Jul. 5, 2007, now Pat. No. 8,171,238.

(51) Int. Cl.
*G06F 12/00* (2006.01)
*G06F 13/00* (2006.01)
*G06F 13/28* (2006.01)

(52) U.S. Cl.
USPC .............. 711/154; 707/999.103; 707/999.106

(58) Field of Classification Search
USPC ..................... 711/154; 707/999.103, 999.106
See application file for complete search history.

(56) References Cited

U.S. PATENT DOCUMENTS

| | | | |
|---|---|---|---|
| 5,307,413 A | 4/1994 | Denzer | |
| 5,359,720 A | 10/1994 | Tamura et al. | |
| 5,483,556 A | 1/1996 | Pillan et al. | |
| 5,592,613 A | 1/1997 | Miyazawa et al. | |
| 5,611,049 A | 3/1997 | Pitts | |
| 5,675,587 A | 10/1997 | Okuyama et al. | |
| 5,754,774 A | 5/1998 | Bittinger et al. | |
| 5,802,106 A | 9/1998 | Packer | |
| 5,883,891 A | 3/1999 | Williams et al. | |
| 6,000,053 A | 12/1999 | Levine et al. | |
| 6,003,087 A | 12/1999 | Housel, III et al. | |
| 6,081,883 A | 6/2000 | Popelka et al. | |
| 6,295,541 B1 | 9/2001 | Bodnar et al. | |
| 6,308,148 B1 | 10/2001 | Bruins et al. | |

(Continued)

FOREIGN PATENT DOCUMENTS

EP 1507353 A2 2/2005

OTHER PUBLICATIONS

"A protocol-independent technique for eliminating redundant network traffic", ACM SIGCOMM Computer Communication Review, vol. 30, Issue 4 (Oct. 2000) pp. 87-95, Year of Publication: 2000.*

(Continued)

*Primary Examiner* — Michael Alsip
(74) *Attorney, Agent, or Firm* — Carr & Ferrell LLP

(57) ABSTRACT

Systems and methods for identification of data stored in memory are provided. A data packet is received and a first packet byte within the data packet is compared to a first memory byte within a memory. A mismatch is determined between the first packet byte and the first memory byte. A memory location is jumped to that contains a second memory byte that is non-consecutive with the first memory byte. A packet location is jumped to that contains a second packet byte that is non-consecutive with the first packet byte. The second packet byte is compared to the second memory byte. A retrieval instruction is generated based at least in part on a result of the comparison between the second packet byte and the second memory byte. Various embodiments may be included in a network memory architecture to allow for faster data matching and instruction generation in a central appliance.

27 Claims, 10 Drawing Sheets

(56) References Cited

U.S. PATENT DOCUMENTS

| | | |
|---|---|---|
| 6,311,260 B1 | 10/2001 | Stone et al. |
| 6,374,266 B1 | 4/2002 | Shnelvar |
| 6,434,662 B1 | 8/2002 | Greene et al. |
| 6,438,664 B1 | 8/2002 | McGrath et al. |
| 6,452,915 B1 | 9/2002 | Jorgensen |
| 6,587,985 B1 | 7/2003 | Fukushima et al. |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,674,769 B1 | 1/2004 | Viswanath |
| 6,718,361 B1 | 4/2004 | Basani et al. |
| 6,738,379 B1 | 5/2004 | Balazinski et al. |
| 6,769,048 B2 | 7/2004 | Goldberg et al. |
| 6,791,945 B1 | 9/2004 | Levenson et al. |
| 6,856,651 B2 | 2/2005 | Singh |
| 6,859,842 B1 | 2/2005 | Nakamichi et al. |
| 6,910,106 B2 | 6/2005 | Sechrest et al. |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagaranjan et al. |
| 7,035,214 B1 | 4/2006 | Seddigh et al. |
| 7,069,342 B1 | 6/2006 | Biederman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,197,597 B1 | 3/2007 | Scheid et al. |
| 7,200,847 B2 | 4/2007 | Straube et al. |
| 7,215,667 B1 | 5/2007 | Davis |
| 7,242,681 B1 | 7/2007 | Van Bokkelen et al. |
| 7,243,094 B2 | 7/2007 | Tabellion et al. |
| 7,266,645 B2 | 9/2007 | Garg et al. |
| 7,318,100 B2 | 1/2008 | Demmer et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie, III et al. |
| 7,389,393 B1 | 6/2008 | Karr et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,451,237 B2 | 11/2008 | Takekawa et al. |
| 7,453,379 B2 | 11/2008 | Plamondon |
| 7,457,315 B1 | 11/2008 | Smith |
| 7,471,629 B2 | 12/2008 | Melpignano |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,619,545 B2 | 11/2009 | Samuels et al. |
| 7,620,870 B2 | 11/2009 | Srinivasan et al. |
| 7,639,700 B1 | 12/2009 | Nabhan et al. |
| 7,676,554 B1 | 3/2010 | Malmskog et al. |
| 7,714,747 B2 | 5/2010 | Fallon |
| 7,746,781 B1 | 6/2010 | Xiang |
| 7,849,134 B2 | 12/2010 | McCanne et al. |
| 7,853,699 B2 | 12/2010 | Wu et al. |
| 7,873,786 B1 | 1/2011 | Singh et al. |
| 7,953,869 B2 | 5/2011 | Demmer et al. |
| 8,140,757 B1 | 3/2012 | Singh et al. |
| 8,595,314 B1 | 11/2013 | Hughes |
| 2001/0054084 A1 | 12/2001 | Kosmynin |
| 2002/0007413 A1 | 1/2002 | Garcia-Luna-Aceves et al. |
| 2002/0040475 A1 | 4/2002 | Yap et al. |
| 2002/0065998 A1 | 5/2002 | Buckland |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0131434 A1 | 9/2002 | Vukovic et al. |
| 2002/0150041 A1 | 10/2002 | Reinshmidt et al. |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0123481 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0086114 A1 | 5/2004 | Rarick |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0190694 A1 | 9/2005 | Ben-Nun et al. |
| 2005/0210151 A1 | 9/2005 | Abdo et al. |
| 2005/0220019 A1 | 10/2005 | Melpignano |
| 2005/0235119 A1 | 10/2005 | Sechrest et al. |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0286526 A1 | 12/2005 | Sood et al. |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0143497 A1 | 6/2006 | Zohar et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0280205 A1 | 12/2006 | Cho |
| 2007/0002804 A1 | 1/2007 | Xiong et al. |
| 2007/0011424 A1 | 1/2007 | Sharma et al. |
| 2007/0076693 A1 | 4/2007 | Krishnaswamy |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0174428 A1 | 7/2007 | Lev Ran et al. |
| 2007/0195702 A1 | 8/2007 | Yuen et al. |
| 2007/0198523 A1 | 8/2007 | Hayim |
| 2007/0226320 A1 | 9/2007 | Hager et al. |
| 2007/0244987 A1 | 10/2007 | Pedersen et al. |
| 2007/0245079 A1 | 10/2007 | Bhattacharjee et al. |
| 2007/0258468 A1 | 11/2007 | Bennett |
| 2007/0263554 A1 | 11/2007 | Finn |
| 2007/0276983 A1 | 11/2007 | Zohar et al. |
| 2008/0005156 A1 | 1/2008 | Edwards et al. |
| 2008/0013532 A1 | 1/2008 | Garner et al. |
| 2008/0016301 A1 | 1/2008 | Chen |

(56) References Cited

U.S. PATENT DOCUMENTS

| | | | |
|---|---|---|---|
| 2008/0028467 | A1 | 1/2008 | Kommareddy et al. |
| 2008/0133536 | A1 | 6/2008 | Bjorner et al. |
| 2008/0184081 | A1 | 7/2008 | Hama et al. |
| 2008/0229137 | A1 | 9/2008 | Samuels et al. |
| 2008/0243992 | A1 | 10/2008 | Jardetzky et al. |
| 2008/0313318 | A1 | 12/2008 | Vermeulen et al. |
| 2008/0320151 | A1 | 12/2008 | McCanne et al. |
| 2009/0060198 | A1 | 3/2009 | Little |
| 2009/0100483 | A1 | 4/2009 | McDowell |
| 2009/0158417 | A1 | 6/2009 | Khanna et al. |
| 2009/0175172 | A1 | 7/2009 | Prytz et al. |
| 2009/0234966 | A1 | 9/2009 | Samuels et al. |
| 2010/0011125 | A1 | 1/2010 | Yang et al. |
| 2010/0020693 | A1 | 1/2010 | Thakur |
| 2010/0115137 | A1 | 5/2010 | Kim et al. |
| 2010/0290364 | A1 | 11/2010 | Black |

OTHER PUBLICATIONS

"IPsec Anti-Replay Window: Expanding and Disabling," Cisco IOS Security Configuration Guide. 2005-2006 Cisco Systems, Inc. Last updated: Sep. 12, 2006, 14pages (Previously cited as: Zhao et al.; "Analysis and Improvement on IPSEC Anti-Replay Window Protocol"; 2003; IEEE' pp. 553-558).

Singh et al. ; "Future of Internet Security—IPSEC"; 2005; pp. 1-8.

Muthitacharoen, Athicha et al., "A Low-bandwidth Network File System," 2001, in Proc. of the 18th ACM Symposium on Operating Systems Principles, Banff, Canada, pp. 174-187.

"Shared LAN Cache Datasheet", 1996, http://www.lancache.com/slcdata.htm.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

Hong, B et al. "Duplicate data elimination in a SAN file system", In Proceedings of the 21st Symposium on Mass Storage Systems (MSS '04), Goddard, MD, Apr. 2004. IEEE.

You, L. L. and Karamanolis, C. 2004. "Evaluation of efficient archival storage techniques", In Proceedings of the 21st IEEE Symposium on Mass Storage Systems and Technologies (MSST).

Douglis, F. et al., "Application specific Delta-encoding via Resemblance Detection", Published in the 2003 USENIX Annual Technical Conference.

You, L. L. et al., "Deep Store an Archival Storage System Architecture" Data Engineering, 2005. ICDE 2005. Proceedings of the 21st. Intl. Conf. on Data Eng., Tokyo, Japan, Apr. 5-8, 2005, pp. 12.

Manber, Udi, "Finding Similar Files in a Large File System", TR 93-33 Oct. 1994, Department of Computer Science, University of Arizona. http://webglimpse.net/pubs/TR93-33.pdf. Also appears in the 1994 winter USENIX Technical Conference.

Knutsson, Bjorn et al., "Transparent Proxy Signalling", Journal of Communications and Networks, vol. 3, No. 2, Jun. 2001.

Newton, "Newton's Telecom Dictionary", 17th Ed., 2001, pp. 38, 201, and 714.

\* cited by examiner

IDENTIFICATION OF DATA STORED IN MEMORY

CROSS-REFERENCES

This nonprovisional U.S. patent application is a continuation of U.S. nonprovisional patent application Ser. No. 11/825,440 filed Jul. 5, 2007 now U.S. Pat. No. 8,171,238 and entitled, "Identification of Data Stored in Memory", which is related to U.S. nonprovisional patent application Ser. No. 11/825,497 filed Jul. 5, 2007 and entitled, "Pre-Fetching Data Into a Memory" and U.S. nonprovisional application Ser. No. 11/202,697 filed Aug. 12, 2005 entitled "Network Memory Architecture for Providing Data Based on Local Accessibility". Each of the above referenced applications is hereby incorporated by reference.

BACKGROUND

1. Field of the Invention

The present invention is related to accessing data stored in a memory and more specifically related to identification of data stored in memory.

2. Description of the Related Art

As computing becomes increasingly common, the speed in which data is searched and retrieved becomes increasingly important. When searching for desired data, within one or more systems, the bytes of the desired data are compared to previously stored bytes. Typically, the comparison between the desired data and the previously stored data is performed by searching for identical sequences of data. If the previously stored data is not stored in a sequence identical to the sequence of the desired data, the search may fail. As a result, slight variations in the sequence of stored data may result in failed searches. Moreover, more time may be lost as the search continues wasting valuable resources beyond when the search should have found the correct data. As a result, when the stored data is not stored sequentially or if only a portion of the desired data is stored in memory, the search will fail. There is, therefore, a need for systems and methods for identifying bytes that are not stored sequentially in memory.

SUMMARY

In exemplary embodiments, a method comprises identifying data stored in a memory. A data packet is received and a first packet byte within the data packet is compared to a first memory byte within a memory. A mismatch is determined between the first packet byte and the first memory byte. A memory location is jumped to that contains a second memory byte that is non-consecutive with the first memory byte. A packet location is jumped to that contains a second packet byte that is non-consecutive with the first packet byte. The second packet byte is compared to the second memory byte. A retrieval instruction is generated based at least in part on a result of the comparison between the second packet byte and the second memory byte.

In various embodiments, a number of packet bytes between the first packet byte and the second packet byte may be equal to a number of memory bytes between the first memory byte and the second memory byte. Further, the second packet byte may be compared to a third memory byte that is consecutive with the second memory byte. In some embodiments, an overwrite command, a deletion command, or an insertion command may be generated. In an exemplary embodiment, the memory may comprise a faster memory in a network memory appliance. In some embodiments, the data packet may be pre-scanned. A final packet byte may be compared to a third memory byte and an initial second packet byte in a second data packet may be compared to a fourth memory byte consecutive with the third memory byte.

In other exemplary embodiments, a system for identification of data stored in a memory may comprise a comparison module and a data module. The comparison module is configured to compare a first packet byte within the data packet to a first memory byte within a memory, determine a mismatch between the first packet byte and the first memory byte, jump to a memory location containing a second memory byte that is non-consecutive with the first memory byte, jump to a packet location containing a second packet byte that is non-consecutive with the first packet byte, and compare the second packet byte to the second memory byte. The data module is configured to generate a retrieval instruction based at least in part on a result of the comparison between the second packet byte and the second memory byte.

In various embodiments, a computer readable medium may have embodied thereon a program, the program being executable by a processor for performing a method for generating a retrieval instruction based on matched data is disclosed. The method may comprise receiving a data packet, comparing a first packet byte within the data packet to a first memory byte within a memory, determining a mismatch between the first packet byte and the first memory byte, jumping to a memory location containing a second memory byte that is non-consecutive with the first memory byte, jumping to a packet location containing a second packet byte that is non-consecutive with the first packet byte, comparing the second packet byte to the second memory byte, and generating a retrieval instruction based at least in part on a result of the comparison between the second packet byte and the second memory byte.

DETAILED DESCRIPTION

Figure 1:
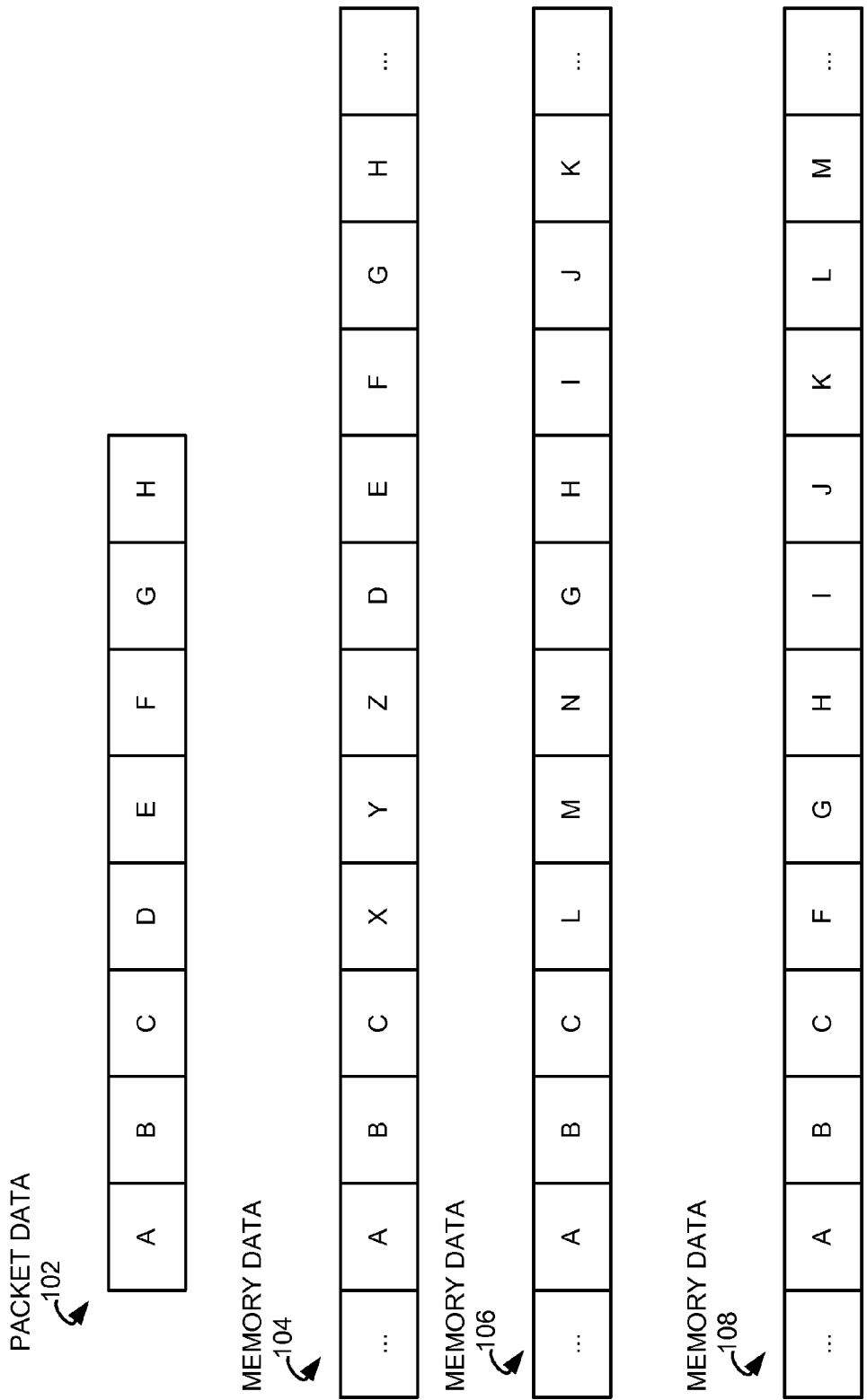
FIG. 1 is a diagram of various memory data sequences according to various embodiments.

Systems and methods for matching received data to data stored in a RAM are provided. To illustrate, FIG. 1 is a diagram of various memory data sequences according to various embodiments. According to the various embodiments, packet data 102 may be received by a digital device having a processor configured to execute instructions stored on a computer-readable medium. Examples of digital devices include a computer, server, network memory appliance (which is further described in FIG. 10), or the like. The packet data 102 may be received in a data packet. The packet data 102 may be an entire data packet (e.g., an Internet Protocol (IP) packet) or may include a portion of the bytes in the received data packet. Alternatively, packet data 102 may comprise more than one packet (e.g., a plurality of packets, a data packet as well as a portion of another data packet, or portions of a plurality of data packets). In some embodiments, data (such as header data) may be excluded.

The packet data 102 comprises a series of bytes that, at least partially, match memory data stored in the memory. In the memory, the stored memory data may include insertions, overwrites, and/or deletions relative to the packet data 102. In memory data 104, for example, the bytes X, Y, and Z located between bytes C and D represent an insertion relative to the packet data 102. In memory data 106, for example, the bytes L, M, and N, in place of bytes D, E, and F represent an overwrite relative to the packet data 102. In memory data 108, for example, the bytes D, E, and F are absent, representing a deletion relative to the packet data 102. According to various embodiments, combinations of insertions, overwrites, and/or deletions may be present in the memory. After the insertions, overwrites, and/or deletions are identified in the memory, a retrieval instruction may be generated according to the identifications.

According to various embodiments, a retrieval instruction comprises commands and/or data to reassemble the packet data 102 from the data in the memory. For example, as in memory data 104, if an insertion is present, the retrieval instruction may comprise a command to delete the insertion. As in memory data 106, if an overwrite is present, the retrieval instruction may comprise a command to overwrite the data in the memory with a portion of the data (e.g., overwrite L, M, and N with D, E, and F) provided in the packet data 102. Further, as in memory data 108, if a deletion is present, the retrieval instruction may comprise a command to insert a portion of the data (e.g., D, E, and F) provided in the packet data 102. Thus, the retrieval instruction indicates how to transform data in memory into the packet data 102. Although bytes are used to describe various embodiments of the invention, it will be appreciated by those skilled in the art that other discrete portions of data including but not limited to segments, bits, and/or packets may be compared. Although examples are contemplated herein with respect to random access memory (RAM), those skilled in the art will appreciate that any kind of memory may be used.

Figure 2:
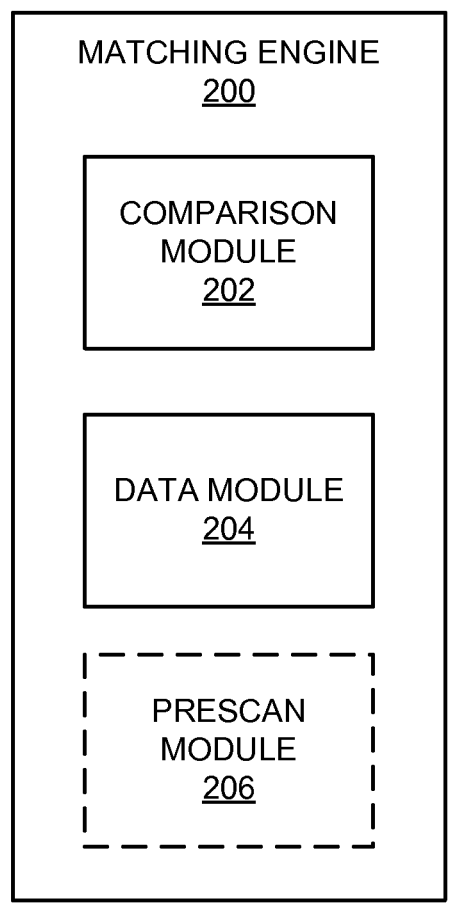
FIG. 2 is a block diagram of an exemplary matching engine according to various embodiments.

FIG. 2 is a block diagram of an exemplary matching engine 200 according to various embodiments. The matching engine 200 may comprise a comparison module 202, a data module 204, and an optional prescan module 206. The matching engine 200 is configured to match the packet data to the data in the RAM and generate the retrieval instruction. The matching engine 200 is described herein as being configured to access RAM. It is understood that the systems and methods described herein may be implemented to access other types of memory including, but not limited to, volatile and non-volatile memory.

The comparison module 202 is configured to compare a series of packet bytes in the packet data 102 to memory bytes in the RAM. According to various embodiments, the RAM may comprise memory data 104, memory data 106, memory data 108, or another memory data including a combination of insertions, overwrites, and/or deletions. The comparison module 202 receives a data packet comprising packet data 102 and determines an initial match between a packet byte within the packet data 102 and a memory byte within the RAM. A packet byte is a byte of data within the data packet. A memory byte is a byte of data within the RAM. If no initial match is determined, the comparison module 202 may not continue to search the RAM.

However, when matching data is determined, if the next packet byte does not match a corresponding next memory byte, the comparison module 202 jumps to another memory location containing another memory byte that is non-consecutive with the previous memory byte and likewise jumps to a packet location containing another packet byte that is non-consecutive with the previous packet byte. A "jump," as used herein, refers to accessing a byte that is not sequential to a previously accessed byte. The comparison module 202 then compares the second packet byte to the second memory byte.

The data module 204 is configured to generate a retrieval instruction based, at least in part, on a result of the comparison between the second packet byte and the second memory byte. The retrieval instruction may comprise commands indicating one or more memory bytes in the RAM to be deleted, inserted (e.g., overwritten), or added. In some embodiments, the retrieval instruction may be sent to a second digital device having a copy of the memory bytes in RAM. To update the memory bytes in the RAM of the second digital device, the second digital device executes the received retrieval instruction.

The optional prescan module 206 may be present in digital devices having a slower memory (not shown) such as a hard disk, FLASH memory, or the like. Prior to comparison by the comparison module 202, the packet data 102 may be first identified and associated with memory data located in the slower memory similar to the packet data 102. The prescan module 206 is configured to copy data from the slower memory into the RAM to reduce the amount of time required to identify data stored in the slower memory at the moment of processing.

The memory data may be stored in a computer system's slower memory (e.g., hard drive) or RAM. If the memory data is within the RAM, the memory data may be retrieved by the processor when needed with limited delay. However, when the memory data is stored in the slower memory, there may be a significant delay while the memory data is retrieved. This delay may cause poor performance as processing may stall. This delay is compounded when taking into account that other processes, some that also depend on data within the slower memory, may also be stalled as the processor awaits the retrieval of the memory data.

In various embodiments, the packet data 102 can be identified and similar data may be located in the RAM or in the slower memory prior to the moment of processing. In one example, the operation that requires the packet data 102 may be within a queue (e.g., buffer). Instead of identifying the packet data 102 at the moment of processing, the packet data 102 may be identified at the time it is placed in the queue. Once the packet data 102 is identified and located, the memory data may be retrieved from the slower memory and placed into the RAM prior to the moment of processing. As a result, delay caused by retrieval of data from the slower memory and processor stall may be avoided.

The prescan module 206 is configured to prescan the packet data 102 to generate a sample fingerprint corresponding to the packet data 102, identify stored fingerprints identical to the sample fingerprint, and copy stored data corresponding to the identified stored fingerprints into the RAM. Pre-scans are described in greater detail in U.S. nonprovisional patent application Ser. No. 11/825,497 filed Jul. 5, 2007 and entitled, "Pre-Fetching Data Into a Memory" which is incorporated herein by reference.

Figure 3:
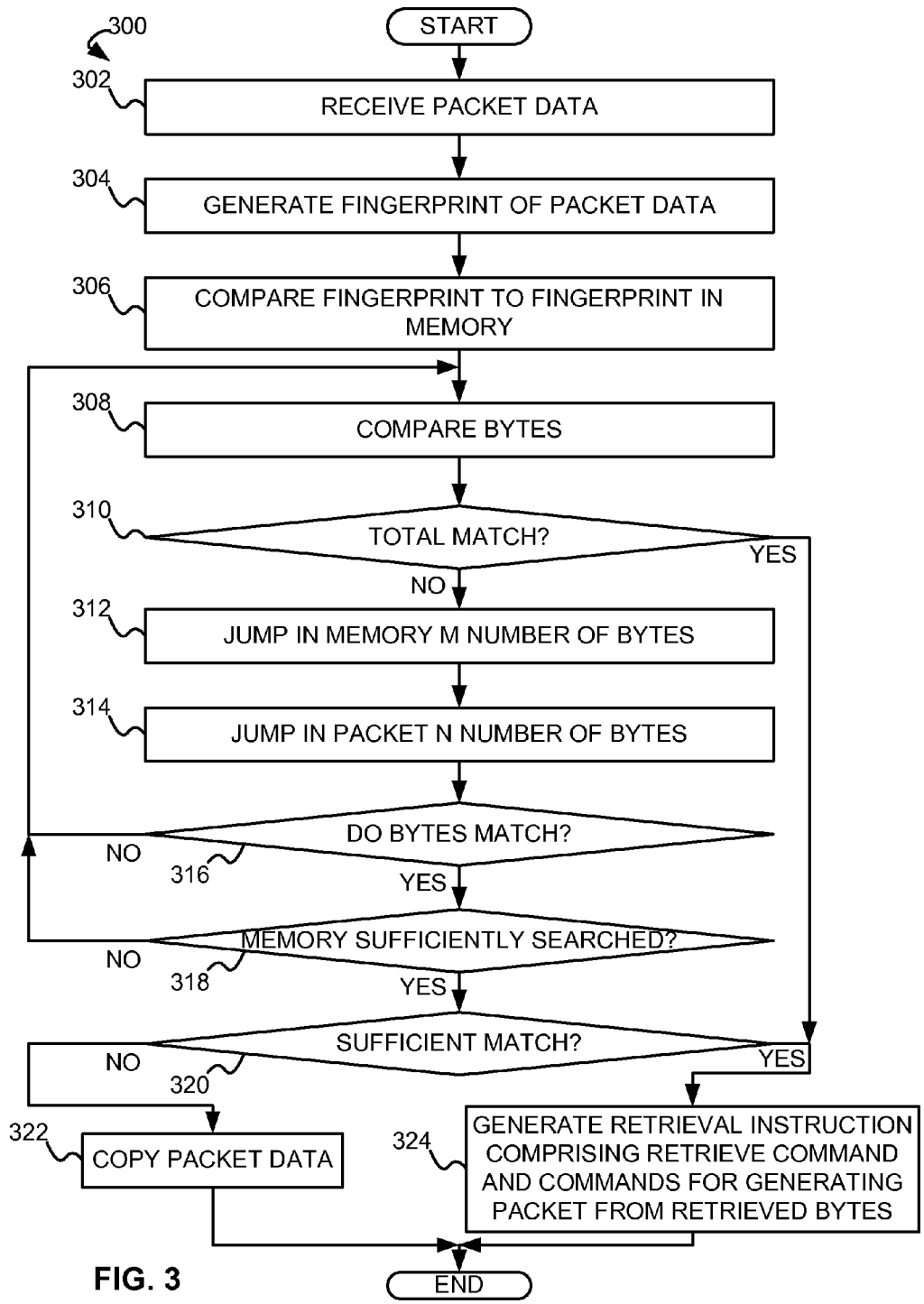
FIG. 3 is a flowchart of an exemplary process for matching data in memory according to various embodiments.

FIG. 3 is a flowchart of an exemplary process 300 for matching data in memory according to various embodiments. In some embodiments, the process 300 may be performed by the matching engine 200. The exemplary process 300 allows data in the memory to be matched to data in a data packet regardless of whether the data in the memory occurs as a single continuous segment.

In step 302, the packet data 102 is received. To determine an initial location in the memory, a sample fingerprint from the packet data 102 is generated in step 304. The sample fingerprint may comprise one or more hash values calculated according to a checksum and/or cyclical redundancy check (CRC) as is known to those skilled in the art. The hashes may be calculated over all or a portion of the bytes of the packet data 102 which may or may not be contiguous. Other methods for generating the sample fingerprint apparent to those skilled in the art may also be used.

In step 306, the sample fingerprint is compared to a fingerprint stored in the memory. If a matching fingerprint is found, the matching fingerprint is used to determine where to begin matching data in the memory to the packet data 102.

In some embodiments, data is retrieved from a slower memory and stored into the faster memory. The data may be retrieved from the slower memory anytime prior to the comparison discussed in step 308. In one example, the stored data is retrieved from the slower memory and stored into RAM after a match is found between the sample fingerprint and the fingerprint stored in memory. This process is further discussed in greater detail in U.S. nonprovisional patent application Ser. No. 11/825,497 filed Jul. 5, 2007 and entitled, "Pre-Fetching Data Into a Memory."

Once the initial match is located, the first memory byte corresponding to the stored fingerprint and the first packet byte are compared in step 308. The comparison is discussed in greater detail in connection with, at least, FIG. 4.

In step 310, a determination is made as to whether there is a total match between the packet data 102 and the data in the memory. The determination that a total match exists may be an indication that a substantial portion of the packet data 102 is stored sequentially in the memory. If there is a total match, the exemplary process 300 continues to step 324.

If there is no total match, in step 312, a number of memory bytes, m, may be jumped in the memory. The number, m, of memory bytes jumped may be pre-defined and/or determined according to an algorithm. Examples of algorithms that may be used include algorithms that enable parallel comparisons of more than one byte. The algorithm may be based on random or non-random numbers and may be deterministic. Any number of memory bytes may be jumped as long as the jump concludes at a memory location containing a second memory byte that is typically non-consecutive with the first memory byte.

Likewise, in step 314, a number of packet bytes, n, may be jumped in the packet data. The number of packet bytes jumped in the packet data 102, n, may, in some embodiments, be equal to the number of memory bytes jumped in the memory, m. Any number of packet bytes may be jumped as long as the jump concludes at a packet location containing a second packet byte that is non-consecutive with the first packet byte. According to various embodiments, memory bytes or packet bytes may be jumped in a forward and/or a backward direction in the memory and/or in the packet data 102.

In step 316, a determination is made as to whether the bytes at the packet location and at the memory location match. If the bytes do not match, the process returns to step 308.

If the bytes do match, a determination is made as to whether the memory is sufficiently searched in step 318. The determination may be made based on a number of jumps, a percentage of the memory searched, a total number of memory bytes searched, or the like. If the memory has not been sufficiently searched, the process 300 returns to step 308.

If the memory has been sufficiently searched, a determination is made as the whether the match is sufficient in step 320. The sufficiency of the match may be determined based on a threshold number of bytes having a match, a percentage of the bytes having a match, or the like.

If there was not a sufficient match in step 320, a copy of the packet data is generated. According to embodiments comprising more than one digital device, the copy of the packet data or the packet data itself may be sent to another digital device (e.g., the packet of data may be sent literally from one digital device to another).

If there was a sufficient match in step 320 or if there was a total match in step 310, a retrieval instruction is generated in a step 324. The retrieval instruction may comprise a retrieve command indicating a segment of the memory and/or commands for generating the packet data 102 from the retrieved bytes.

Figure 4:
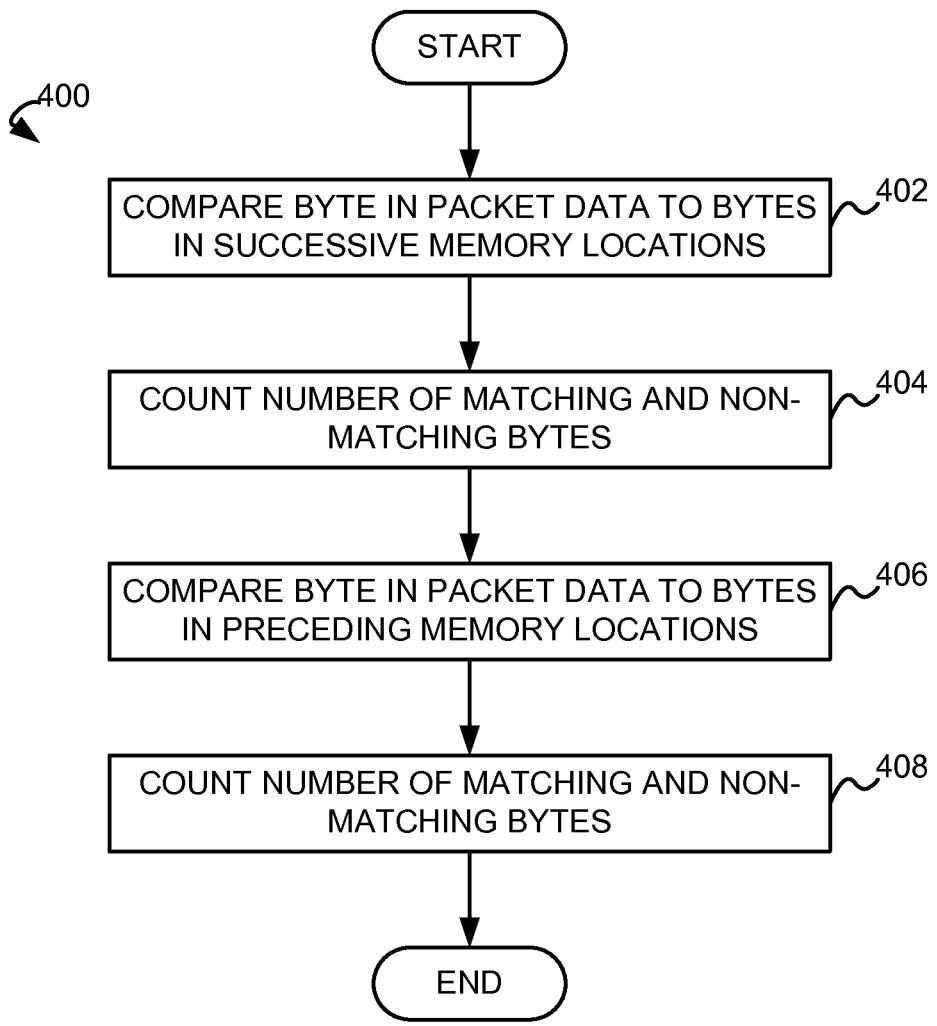
FIG. 4 is a flowchart of an exemplary process for comparing bytes in memory according to various embodiments.

FIG. 4 is a flowchart of an exemplary process 400 for comparing bytes in memory according to various embodiments. The process 400 may be performed as part of step 308 in FIG. 3. The comparison performed using process 400 allows a single packet byte to be compared to a plurality of memory bytes.

In step 402, the bytes in the packet data 102 are compared to bytes in successive memory locations in the memory. Thus, the bytes in the packet data 102 are compared, at least, one by one, to the bytes in the memory. Each successive memory byte may be compared to a successive packet byte in the packet data 102.

In step 404, the number of matching bytes and the number of non-matching bytes are counted. The count(s) may be used to generate the retrieval instruction or to determine whether the memory data has been sufficiently searched. The counts may be calculated from the initial location determined in step 306 or based on the jumped location in the packet data and/or in the memory data.

In step 406, the bytes in the packet data 102 are compared to bytes in preceding memory locations, similar to the comparison performed in the step 402. It is understood that steps 402 and 406 may be performed interchangeably and/or simultaneously. In step 408, like in step 404, the number of matching bytes and the number of non-matching bytes are counted.

In FIGS. 5-7 and 9, the individual bytes are referred to by a letter such as A, B, C, etc. For simplicity, the letter is used to represent the contents of the memory location. For example, the letter A represents a specific bit sequence of 8, 16, 32, 64, etc. bits. Further, in the following description, the letter is also used to identify the location in the data that contains, for example, byte A. For example, in some instances, "byte A" can also be read as "the location that contains byte A". It is understood that the location may be associated with an address as is known to those skilled in the art.

Figure 5:
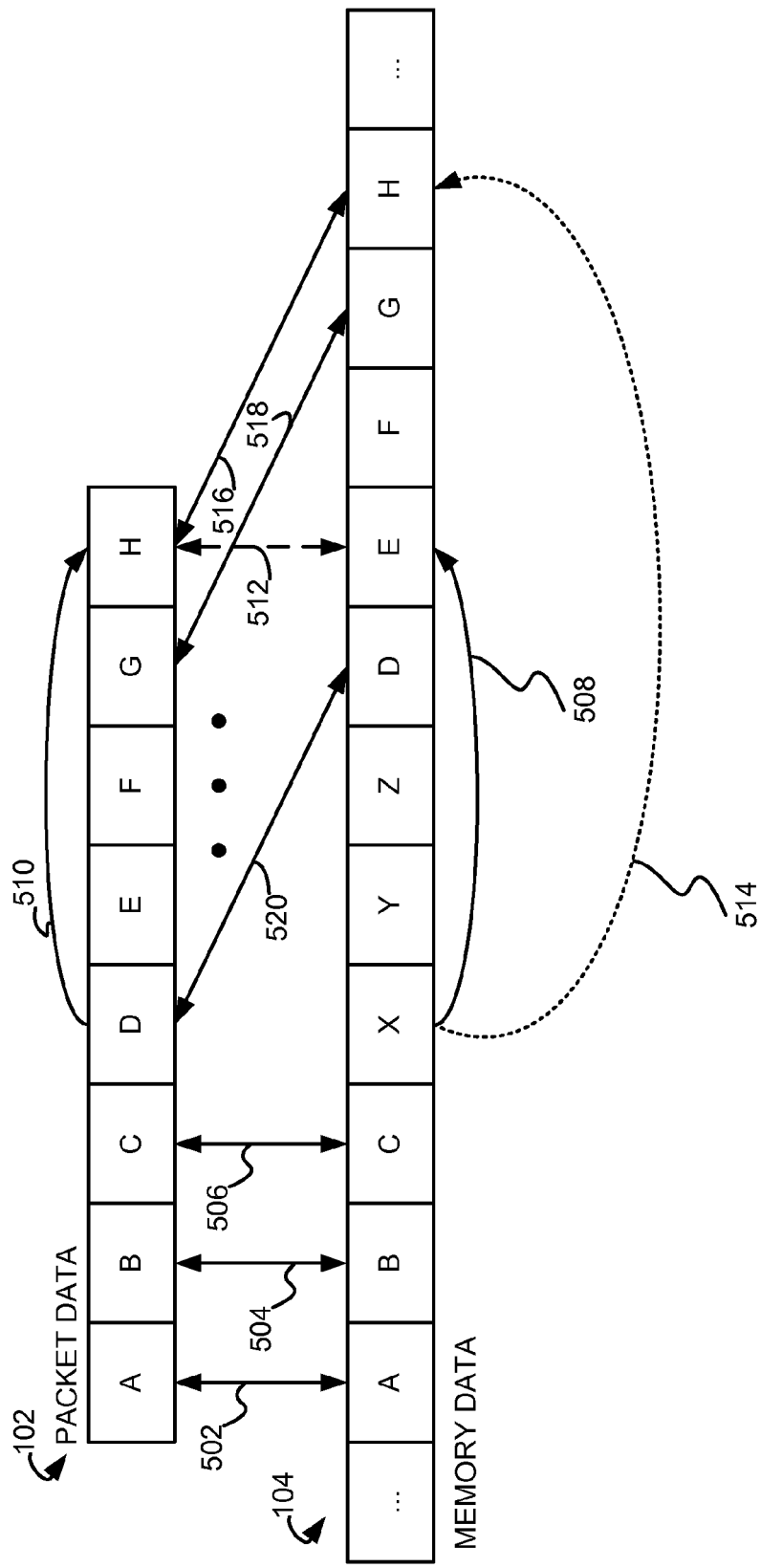
FIG. 5 is a diagram of a first exemplary slip search according to various embodiments.

FIG. 5 is a diagram of a first exemplary slip search according to various embodiments. The first exemplary slip search depicts an instance in which there are, relative to the packet data 102, bytes inserted (e.g., X, Y, and Z) into the memory data 104.

In the depicted instance, a fingerprint match identifies an initial match 502 for byte A. The bytes in the packet data 102 is compared to successive bytes in the memory data 104 to determine matches 504 and 506 between bytes B and C, respectively. At packet byte D, a mismatch is determined between packet byte D in the packet data 102 and byte X in the memory data 104.

Upon determining a mismatch, a jump 508 to another location in the memory data 104 is made. Likewise, a jump 510 to another location in the packet data 102 is made. In the embodiment shown, the number of bytes traversed by jump 508 is the same as the number of bytes traversed by jump 510. In alternate embodiments, the number of bytes traversed by jump 508 may be different from the number of bytes traversed by jump 510. For simplicity, the jump is depicted as five bytes. However, in other embodiments, the jumps 508 and/or 510 may be any number of bytes long, such as 1, 10, 100, 1,000, or 10,000 bytes.

The jump 508 terminates at a location containing byte E in the memory data 104. Likewise, the jump 510 terminates at a location containing byte H in the packet data 102. Byte E in the memory data 104 is compared to byte H in the packet data. A mismatch is determined and the memory data 104 is searched successively by comparing byte H in the packet data 102 to successive sequential memory bytes. In some embodiments, preceding sequential memory bytes may be compared to the packet byte H.

According to other embodiments, additional jumps may be performed if the mismatch 512 is determined. For example, a second jump 514, similar to jump 508, may be performed in the memory data 104 if a mismatch between packet byte H and memory byte E is determined. In other embodiments, the additional jump may be performed in the packet data 102 or in both the memory data 104 and the packet data 102. According to further embodiments, multiple jumps in the packet data 102 and/or the memory data 104 may be performed in parallel. The multiple jumps may occur in a backwards and/or a forwards direction.

At 516, a match is determined between byte H of the packet data 102 and byte H of the memory data 104. In some embodiments, because the byte H is at the end of the packet data 102, the preceding bytes in the memory data 104 are compared. A match 518 is determined between packet byte G and memory byte G. The preceding bytes in the memory data 104 are compared to the corresponding packet bytes until a mismatch is determined or until a previously matched byte is found. In FIG. 5, for example, the comparison terminates at match 520 determined between one of the packet bytes and a corresponding memory byte. Thus, each of the bytes in the packet data have been matched to corresponding bytes in the memory data by comparing successive bytes, comparing preceding bytes, and jumping bytes.

A retrieval instruction may be generated to identify the matches and/or mismatches in the memory data 104 compared to the packet data 102. The retrieval instruction may, for example, comprise a command to access bytes occurring between bytes A and H from the memory data 104 or from a second memory data (not shown) having the same bytes as memory data 104. The retrieval instruction may additionally comprise a command to delete bytes X, Y, and Z from the accessed bytes. Other retrieval instructions that may be generated based on the matched bytes will be apparent to those skilled in the art.

Figure 6:
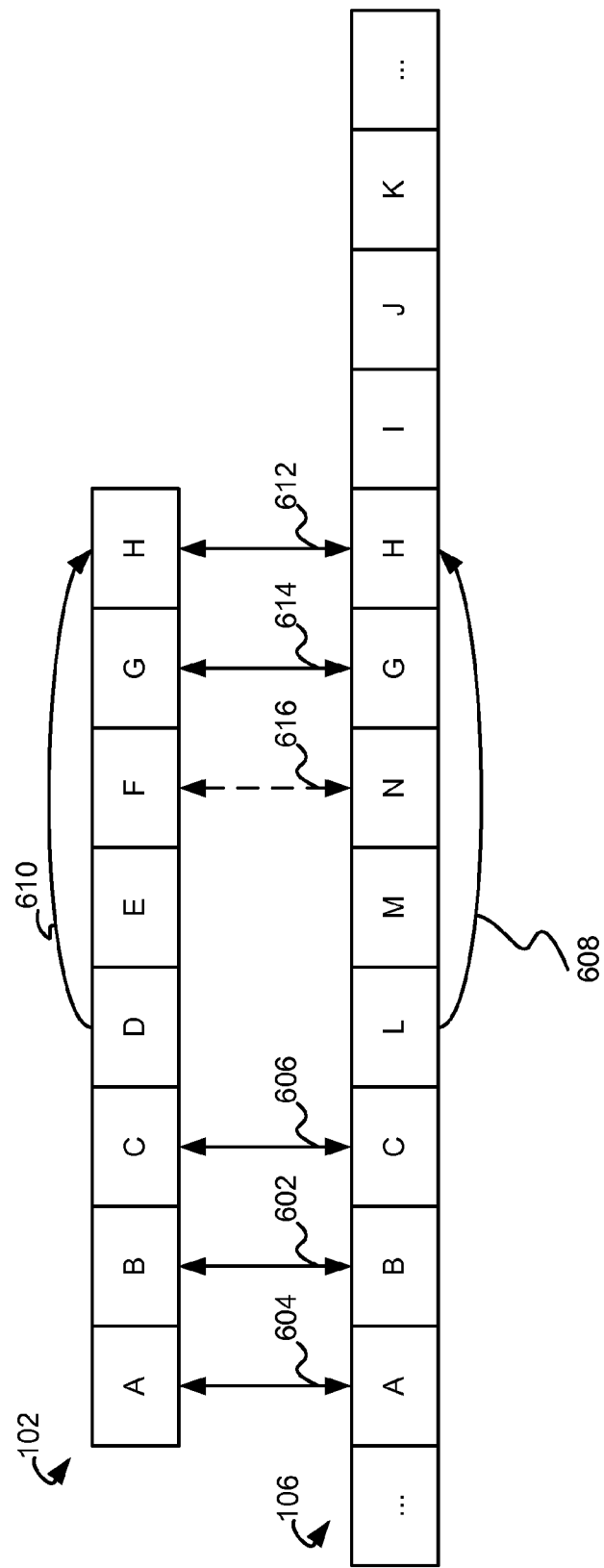
FIG. 6 is a diagram of a second exemplary slip search according to various embodiments.

FIG. 6 is a diagram of a second exemplary slip search according to various embodiments. The second exemplary slip search depicts an exemplary instance in which a portion of the packet data 102 is different from a corresponding portion of the memory data 106. Thus, to generate the packet data 102 from the memory data 106, an overwrite is performed to replace the different bytes.

In this instance, an initial match 602 is determined between bytes B in the packet data 102 and the memory data 106. In the depicted instance, the preceding bytes are compared first, resulting in a match 604 between byte A of the packet data 102 and byte A of the memory data 106. Since byte A is a terminal byte in the packet data 102, the comparison may progress to the packet byte succeeding the initial match. A match 606 is determined between packet byte C and memory byte C.

At packet byte D, a mismatch is determined between packet byte D and memory byte L. A jump 608 in the memory data 106 is made to a location containing memory byte H. Likewise, a jump 610 in the packet data 102 is made to a location containing packet byte H. A match 612 is determined between packet byte H and memory byte H. A comparison of the preceding bytes yields a match 614 between byte G of the packet data and byte G of the memory data. Continuing the comparison of preceding bytes, a mismatch 616 is determined between packet byte F and memory byte N. According to some embodiments, another jump in the memory data 106 and/or in the packet data 102 may be performed. If no additional matches are determined, a determination may be made that the memory data 106 has been sufficiently searched.

A retrieval instruction may be generated that includes a command to retrieve bytes occurring in the memory data 106 between byte A and byte H (e.g., bytes A, B, C, L, M, N, G, and H). The retrieval instruction may also comprise copies of bytes D, E, and F. Further, the retrieval instruction may additionally include an instruction to overwrite bytes D, E, and F in place of bytes L, M, and N. Alternatively, for example, a retrieval instruction may comprise a retrieval command for bytes A, B, and C, copies of bytes D, E, and F, and another retrieval command for bytes G and H. Other retrieval instructions that may be generated will be apparent to those skilled in the art.

Figure 7:
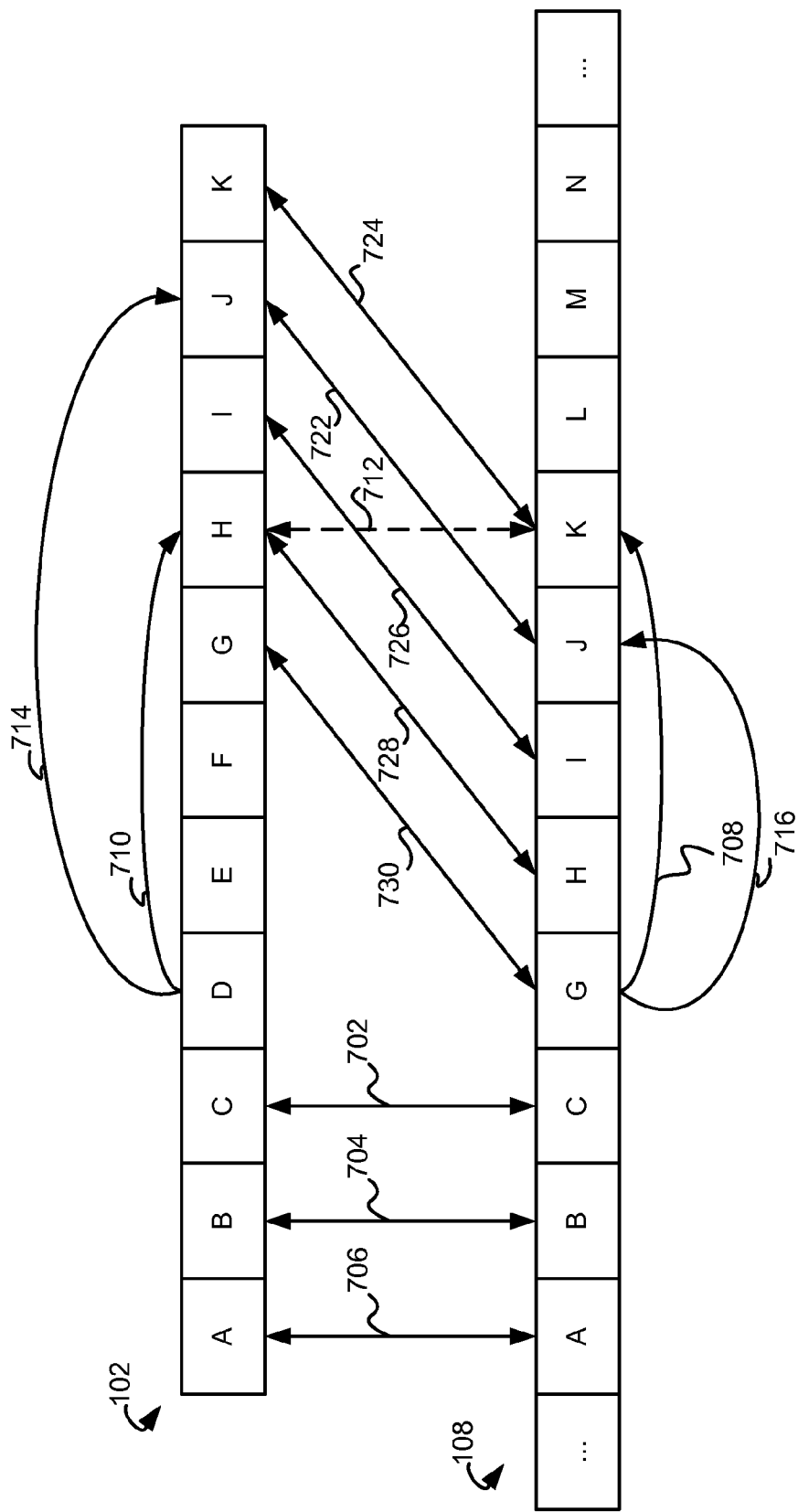
FIG. 7 is a diagram of a third exemplary slip search according to various embodiments.

FIG. 7 is a diagram of a third exemplary slip search according to various embodiments. In the depicted instance, bytes in the packet data 102 are missing in the memory data. Thus, a retrieval instruction may include a command to add bytes to retrieved data.

In the depicted embodiment, an initial match 702 is determined at byte C. The preceding bytes are then compared, resulting in matches 704 and 706 between bytes B and A, respectively. When the successive byte is compared, at packet byte D, a mismatch of memory byte G is determined. Thus, a jump 708 in the memory data 108 is made to a location containing memory byte K. Similarly, a jump 710 in the packet data 102 is made to a location containing packet byte H. A mismatch 712 is determined between the packet byte H and the memory byte K.

When the mismatch is determined, a second jump 714 in the packet data 102 and a second jump 716 in the memory data 108 may be performed. The second jump 714 in the packet data 102 and the second jump 716 in the memory data 108 may be performed, as shown, originating at byte D in the packet data 102 and byte G in the memory data 108 or originating from other bytes in the packet data 102 and in the memory data 108. As shown, the second jumps 714 and 716 result in match 722 between byte J of the packet data 102 and byte J of the memory data 108.

By comparing the successive bytes, match 724 is determined between packet byte K and memory byte K. According to some embodiments, a specified number of bytes in succession may be compared before comparing bytes in the other direction in the memory data 108. It will be apparent to those skilled in the art that the number of bytes may vary and/or that any number of bytes may be compared before comparing bytes in the other direction in the memory data 108.

The comparison between the packet data 102 and the memory data 108 then compares preceding memory bytes and a match 726 between packet byte I and memory byte I is determined. By continuing to compare preceding memory bytes, a match 728 is determined between packet byte H and memory byte H. Further, by comparing preceding bytes, match 730 is determined between packet byte G and memory byte G.

Based on the third exemplary slip search, a retrieval instruction may be generated indicating a command to retrieve memory bytes occurring between bytes A and K. The retrieval instruction may further include a command to add copies of packet bytes D, E, and F to the retrieved memory bytes between bytes C and G. Other retrieval instructions that may be generated will be apparent to those skilled in the art.

Figure 8:
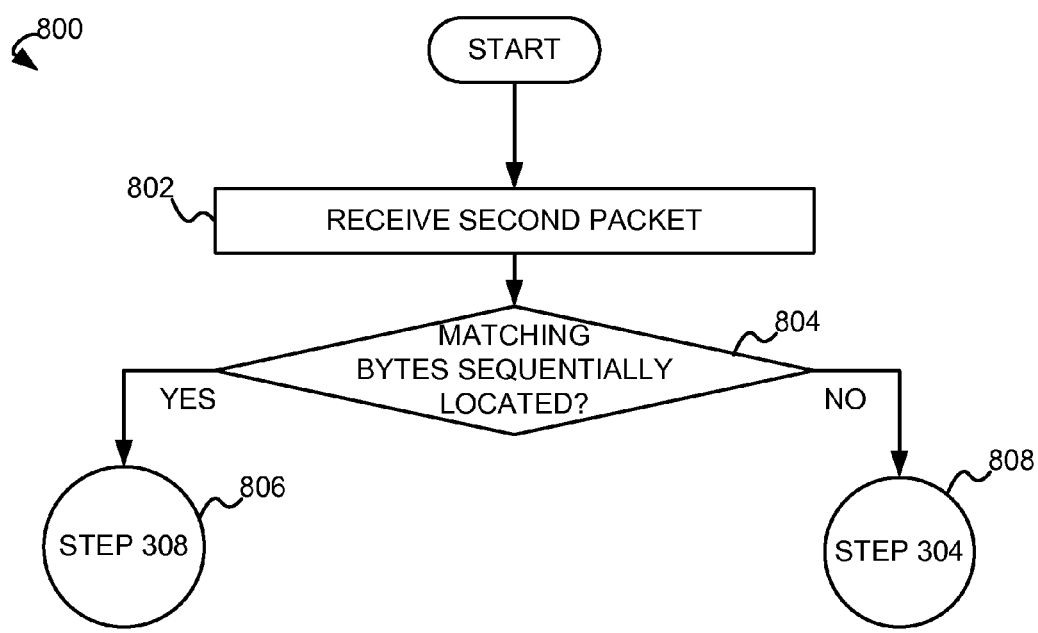
FIG. 8 is a flowchart of an exemplary process for matching a second set of data in memory according to various embodiments.

FIG. 8 is a flowchart of an exemplary process 800 for matching a second set of data in memory according to various embodiments. The exemplary process 800 may be performed by the matching engine 200, and more specifically, by the comparison module 202. The exemplary process 800 may allow for faster identification of data in a second packet received subsequent to the packet data 102 by not requiring that the second packet be fingerprinted to generate an initial match.

In some embodiments, the process 800 is performed if the second packet is associated with the same Internet Protocol (IP) flow or session as the packet data 102. In these embodiments, a determination may be made as to whether the second packet is associated with the same IP flow or session as the packet data 102 based on IP header information or an IP address associated with the second packet.

In step 802, second packet data is received. In step 804, a determination is made as to whether sequential bytes in the memory data match the second packet data. For example, a last byte of packet data 102 may match with a byte in the memory data. The byte of the second packet data may then be compared to a next byte in the memory data that is consecutive to the byte in the memory data.

If the sequential bytes match the second packet data, the process 800 proceeds to step 308 depicted in FIG. 3 as shown in step 806. In step 308, the bytes are compared as described herein. If, however, the sequential bytes do not match the second packet data, the process proceeds to step 304 depicted in FIG. 3 as shown in step 808. In step 304, a sample fingerprint of the second packet data is generated. Based on the fingerprint, an initial match may be determined, as described herein. Thus, the identification of the second packet data may require less time as a fingerprint of the second packet data may not be generated.

Figure 9:
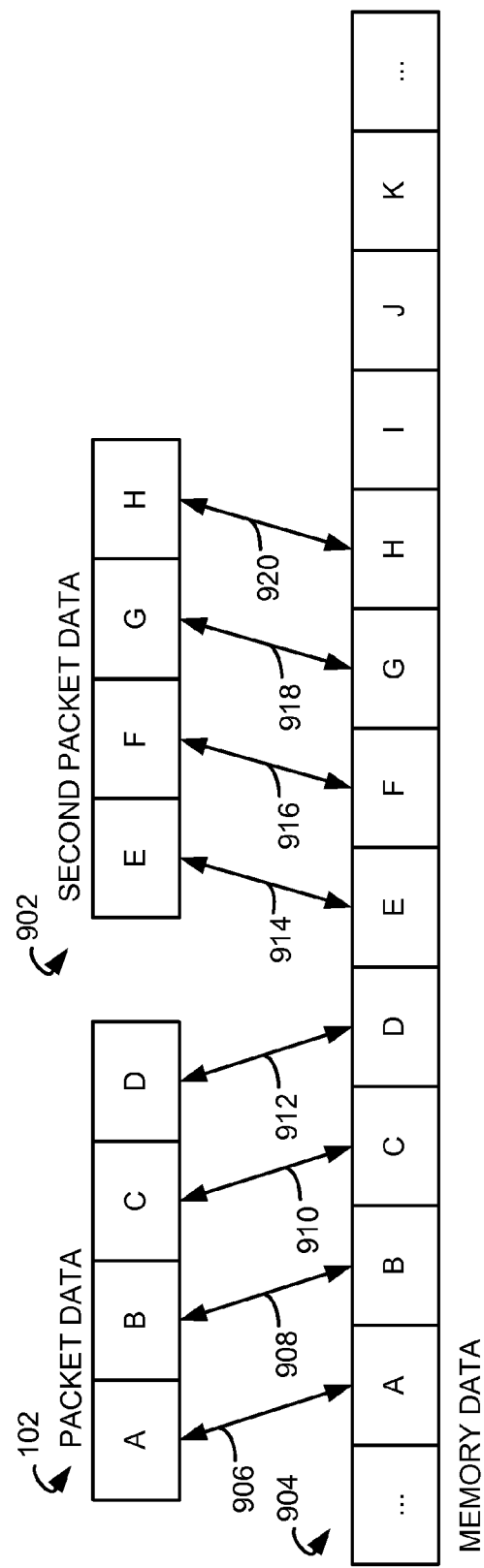
FIG. 9 is a diagram of a fourth exemplary slip search for the second packet data according to various embodiments.

FIG. 9 is a diagram of a fourth exemplary slip search for the second packet data 902 according to various embodiments. The second packet data 902 is received subsequently to the packet data 102. The second packet data 902 may be received as a second data packet. In these embodiments, the packet header data may be removed prior to performing the comparison. According to the process 300, the packet data 102 is compared to the memory data 904 to determine matches 906, 908, 910, and 912. As described above, the matches may include insertions, overwrites, and/or deletions. For simplicity, however, the matches 906, 908, 910, and 912 are depicted as sequential memory bytes. The match 912, between packet byte D and memory byte D, is the terminal match in the packet data 102.

The second packet data 902 comprises one or more bytes that may or may not correspond to the memory data 904. A memory byte consecutive to the memory byte in the terminal match of the preceding packet data (e.g., byte D) is identified (e.g., byte E). A first packet byte of the second packet data, byte E, is compared to the consecutive memory byte, byte E. In the instance shown, a match 914 is determined between byte E in the memory data 904 and byte E in the second packet data 902. Because match 914 is determined, other packet bytes in the second packet data 902 may be compared to bytes in the memory data 904 according to a slip search, without first determining an initial match based on a fingerprint of the second packet data 902. According to some embodiments, a plurality of consecutive memory bytes may be compared to one or more bytes in the second packet data 902 to determine whether the sequential bytes match.

According to process 300, successive packet bytes in the second packet data 902 are compared to successive memory bytes. Thus, matches 916, 918, and 920 are determined between second packet bytes F, G, and H and memory bytes F, G, and H, respectively. For simplicity, the matching bytes are depicted without insertions, overwrites, or deletions. It is understood, however, that insertions, overwrites, and/or deletions may exist in the second packet data 902 and/or in the memory data 904 and still be within the scope of the described embodiments.

Figure 10:
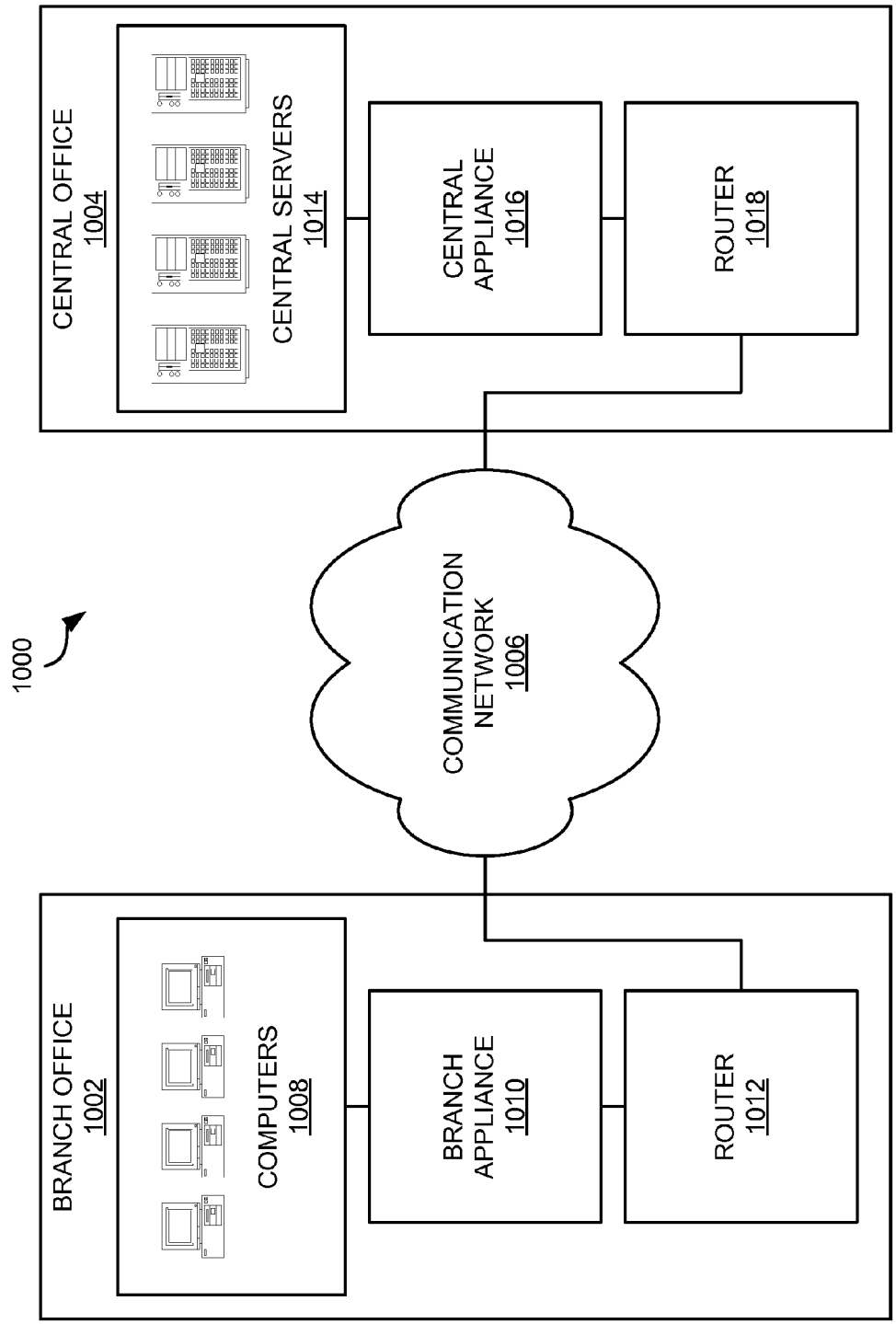
FIG. 10 is an exemplary network memory architecture according to various embodiments.

FIG. 10 illustrates an exemplary network memory architecture 1000 according to various embodiments. The network memory architecture 1000 includes a branch office 1002, a central office 1004, and a communication network 1006. The branch office 1002 includes computers 1008, a branch appliance 1010, and a router 1012. The central office 1004 includes central servers 1014, a central appliance 1016, and a router 1018. The branch appliance 1010 and the central appliance 1016 are examples of network memory appliances.

In the branch office 1002, the computers 1008 are linked to the branch appliance 1010. The branch appliance 1010 is linked to the router 1012. The router 1012 is coupled to the communication network 1006. In the central office 1004, the central servers 1014 are linked to the central appliance 1016. The central appliance 1016 is linked to the router 1018. The router 1018 is coupled to the communication network 1006.

For the sake of simplicity, FIG. 10 illustrates the network memory architecture 1000 having a single branch office 1002 and a single central office 1004, and the respective communication between the branch office 1002 and the central office 1004. The principles discussed herein are equally applicable to multiple branch offices 1002 (not shown) and to multiple central offices 1004 (not shown) which are similarly coupled to the communication network 1006. Branch office/branch office communication and central office/central office communication, as well as multi-appliance and/or multi-node communication and bi-directional communication are further within the scope of the disclosure.

The communication network 1006 comprises hardware and/or software elements that enable the exchange of information (e.g., voice and data) between the branch office 1002 and the central office 1004. Possible implementations of the communication network 1006 include a private wide-area network (WAN), and the Internet. Typical connections from the branch office 1002 to the communication network 1006 (e.g., from the router 1012 and the router 1018) may include ISDN, T1 lines (1.544 Mbps), and broadband connections such as digital subscriber lines (DSL) and cable modems. Other examples include T3 lines (43.232 Mbps), OC3 (155 Mbps), and OC48 (2.5 Gbps), although these are more costly and more likely to be used for interconnection at the central office 1004 or as the backbone of the communication network 1006.

A branch appliance 1010 comprises hardware and/or software elements configured to receive data (e.g., email, files, and databases transactions), determine whether a portion of the data is locally accessible to another appliance (e.g., a central appliance 1016), generate an instruction based on the determination, and transfer the instruction to the other appliance. The branch appliance 1010 also comprises hardware and/or software elements configured to receive an instruction from another appliance (e.g., the central appliance 1016), process the instruction to obtain data, and transfer the data to a computer (e.g., the computers 1008).

Locally accessible data comprises any data transferable to the computer (e.g., the computers 1008 and the central servers 1014) by an appliance (e.g., the branch appliance 1010 and the central appliance 1016) without transferring the data over the communication network 1006. In some examples, the locally accessible data is stored in random access memory (RAM) in the branch appliance 1010, on a hard drive in the branch appliance 1010, or both. In another example, the locally accessible data is accessible by the branch appliance 1010 over a local communication network (such as a LAN), for example, in a network attached storage (NAS) device that is internal or external to the branch office 1002, and/or in an optical or flash storage device.

The instruction to be received by the branch appliance 1010 comprises any message or signal that indicates an action to perform with the data. An instruction may indicate to the branch appliance 1010 to store the data, to retrieve the data, or to forward the data to, for example, the computers 1008. The instruction may be explicit, or may be implicit and based upon instructions indicating to store or retrieve data. In some embodiments, the instruction may indicate an index within a database for storing and retrieving the data.

The central appliance 1016 similarly comprises hardware and/or software elements configured to receive data to be sent to the computer 1008, determine whether a portion of the data is locally accessible to the branch appliance 1010, generate an instruction based on the determination, and transfer the instruction to the other appliance. The central appliance 1016 also comprises hardware and/or software elements configured to receive an instruction from another appliance (e.g., the branch appliance 1010), process the instruction to obtain the data, and transfer the data to a computer (e.g., the central servers 1014).

As illustrated, the branch appliance 1010 is located in-line between the computers 1008 and the router 1012. The central appliance 1016 is also located between the central server 1014 and the router 1018. The branch appliance 1010 and the central appliance 1016 transparently intercept network traffic between the computers 1008 and the central servers 1014. For example, the central appliance 1016 transparently intercepts data sent from the central servers 1014 and addressed to the computers 1008. The computers 1008 and the central servers 1014 advantageously require no additional configuration because the branch appliance 1010 and the central appliance 1016 operate transparently.

Alternatively, the branch appliance 1010 and the central appliance 1016 may be configured as an additional router or gateway. As a router, for example, the branch appliance 1010 appears to the computers 1008 as an extra hop before the router 1012. In some embodiments, the branch appliance 1010 and the central appliance 1016 provide redundant routing or peer routing with the router 1012 and the router 1018.

The central appliance 1016 accesses a record indicating data sent previously to the branch appliance 1010 when generating instructions. In some embodiments, the record may comprise the memory data described herein in connection with FIGS. 1-9. For example, the central appliance 1016 may locally store data sent to the branch appliance 1010. If the data is to be transferred again from the central appliance 1016 to the branch appliance 1010, the central appliance 1016 may determine that the data is locally accessible to the branch appliance 1010 and generate an instruction to the branch appliance 1010 to retrieve the data from its locally accessible memory. The central appliance 1016 sends the instruction to the branch appliance 1010 and the branch appliance 1010 processes the instruction to obtain the data. Subsequently, if the branch appliance 1010 is to transfer the same data to the central appliance 1016, the branch appliance 1010 may make a determination based on having received the data from the central appliance 1016 originally. The branch appliance 1010 determines that the data is therefore locally accessible to the central appliance 1016 and generates an instruction to the central appliance 1016 to retrieve the data and transmits it. The central appliance 1016 then processes the instruction to obtain the data. Therefore, an appliance (e.g., the branch appliance 1010 and the central appliance 1016) in the network memory architecture 1000 advantageously uses data transferred to and from the appliance to reduce network traffic with other appliances in the network memory architecture 1000. The network memory architecture 1000 is further disclosed in U.S. nonprovisional application Ser. No. 11/202,697 filed Aug. 12, 2005 entitled "Network Memory Architecture" which is incorporated by reference herein.

According to some embodiments, a central appliance 1016 may receive a data packet from the central server 1014 comprising data to be sent to the computer 1008. The central appliance 1016 may comprise RAM configured to store a copy of at least a portion of the data that is stored in the branch appliance 1010. The central appliance 1016 may compare packet data in the received data packet to the copy of the data that is stored in the branch appliance 1010 to generate a retrieve instruction. The comparison may be performed according to the systems and methods described herein in connection with FIGS. 1-9.

As described above, the central appliance 1016 may store a record of data received from the branch appliance 1010, sent to the branch appliance 1010, and/or otherwise known to be stored in the branch appliance 1010. Thus, the central appliance, through a plurality of communications with the branch appliance 1010, is configured to create a record (i.e., copy) of the data that is likely to be present in the branch appliance 1010. At least a portion of the record may be stored into RAM in the central appliance 1016. The record may serve as memory data that can be compared to packet data in the received data packets.

According to exemplary embodiments, at least a portion of the record may be stored in a slower memory in the central appliance 1016. In these embodiments, the received data packet may be pre-scanned in order to move data from the slower memory to the RAM prior to the comparison as described, for example, in connection with the prescan module 206. Thus, a comparison may still be performed between the packet data and the memory data stored in the RAM.

The central appliance 1016 may be further configured to generate the retrieval instruction as described herein. Rather than sending the entire data packet to the branch appliance 1010 via the communication network 1006, a retrieval instruction may be sent to reduce the amount of data sent over the communication network 1006. The retrieval instruction comprises commands and/or data that when executed, generate an exact or nearly exact replica of the received data packet from the data stored in the branch appliance 1010 and/or included in the retrieval instruction.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method comprising:
receiving packet data;
comparing individually a first packet byte within the packet data to a first memory byte within memory data;
determining a mismatch between the first packet byte and the first memory byte;
after determining the mismatch between the first packet byte and the first memory byte, accessing a memory location containing a second memory byte, the second memory byte being non-consecutive-with the first memory byte;
accessing a packet location containing a second packet byte, the second packet byte being non-consecutive with any other compared packet byte;
comparing the second packet byte to the second memory byte; and
reassembling the packet data from the memory data based at least in part on a result of the comparison between the second packet byte and the second memory byte.

2. The method of claim 1, wherein a number of packet bytes between the first packet byte and the second packet byte is equal to a number of memory bytes between the first memory byte and the second memory byte.

3. The method of claim 1, further comprising comparing the second packet byte to a third memory byte that is consecutive with the second memory byte.

4. The method of claim 1, further comprising generating an insertion command to insert missing packet bytes into the memory data.

5. The method of claim 1, further comprising generating a deletion command to delete memory bytes not matching the packet data.

6. The method of claim 1, further comprising generating an overwrite command to replace memory bytes with packet bytes.

7. The method of claim 1, wherein the memory data is stored in a faster memory in a network memory appliance.

8. The method of claim 1, further comprising:
pre-scanning the packet data to generate a sample fingerprint;
identifying stored fingerprints identical to the sample fingerprint; and
copying the first memory byte associated with the identified stored fingerprints into the memory.

9. The method of claim 1, further comprising:
comparing a final packet byte to a fourth memory byte;
receiving a second packet data comprising an initial second packet byte; and
comparing the initial second packet byte of the second packet data to a fifth memory byte consecutive with the fourth memory byte.

10. A system comprising:
a comparison module configured to compare individually a first packet byte within a packet data to a first memory byte within a memory data, determine a mismatch between the first packet byte and the first memory byte, access a memory location containing a second memory byte that is non-consecutive with the first memory byte after determining the mismatch between the first packet byte and the first memory byte, access a packet location containing a second packet byte that is non-consecutive with any other compared packet byte, and compare the second packet byte to the second memory byte; and
a data module configured to reassemble the packet data from the memory data based at least in part on a result of the comparison between the second packet byte and the second memory byte.

11. The system of claim 10, wherein a number of packet bytes between the first packet byte and the second packet byte is equal to a number of memory bytes between the first memory byte and the second memory byte.

12. The system of claim 10, wherein the comparison module is further configured to compare the second packet byte to a third memory byte that is consecutive with the second memory byte.

13. The system of claim 10, wherein the data module is further configured to generate an insertion command to insert missing packet bytes into the memory data.

14. The system of claim 10, wherein the data module is further configured to generate a deletion command to delete memory bytes not matching the packet data.

15. The system of claim 10, wherein the data module is further configured to generate an overwrite command to replace memory bytes with packet bytes.

16. The system of claim 10, wherein the memory data is stored in a faster memory in a network memory appliance.

17. The system of claim 10, further comprising a prescan module configured to pre-scan the packet data to generate a sample fingerprint, identify stored fingerprints identical to the sample fingerprint, and copy the first memory byte associated with the identified stored fingerprints into the memory.

18. The system of claim 10, wherein the comparison module is further configured to compare a final packet byte to a fourth memory byte, receive a second packet data comprising an initial second packet byte, and compare the initial second packet byte of the second packet data to a fifth memory byte consecutive with the fourth memory byte.

19. A non-transitory computer readable medium having embodied thereon a program, the program being executable by a processor for performing a method for generating a retrieval instruction based on matched data, the method comprising:
receiving packet data;
comparing individually a first packet byte within the packet data to a first memory byte within memory data;
determining a mismatch between the first packet byte and the first memory byte;
after determining the mismatch between the first packet byte and the first memory byte, accessing a memory location containing a second memory byte, the second memory byte being non-consecutive with the first memory byte;

accessing a packet location containing a second packet byte, the second packet byte being non-consecutive with any other compared packet byte;

comparing the second packet byte to the second memory byte; and reassembling the packet data from the memory data based at least in part on a result of the comparison between the second packet byte and the second memory byte.

20. The non-transitory computer readable medium of claim 19, wherein a number of packet bytes between the first packet byte and the second packet byte is equal to a number of memory bytes between the first memory byte and the second memory byte.

21. The non-transitory computer readable medium of claim 19, wherein the method further comprises comparing the second packet byte to a third memory byte that is consecutive with the second memory byte.

22. The non-transitory computer readable medium of claim 19, wherein the method further comprises generating an insertion command to insert missing packet bytes into the memory data.

23. The non-transitory computer readable medium of claim 19, wherein the method further comprises generating a deletion command to delete memory bytes not matching the packet data.

24. The non-transitory computer readable medium of claim 19, wherein the method further comprises generating an overwrite command to replace memory bytes with packet bytes.

25. The non-transitory computer readable medium of claim 19, wherein the memory data is stored in a faster memory in a network memory appliance.

26. The non-transitory computer readable medium of claim 19, wherein the method further comprises:

pre-scanning the packet data to generate a sample fingerprint;

identifying stored fingerprints identical to the sample fingerprint; and copying the first memory byte associated with the identified stored fingerprints into the memory.

27. The non-transitory computer readable medium of claim 19, wherein the method further comprises:

comparing a final packet byte to a fourth memory byte;

receiving a second packet data comprising an initial second packet byte; and comparing the initial second packet byte of the second packet data to a fifth memory byte consecutive with the fourth memory byte.

* * * * *